(12) United States Patent
Takacs et al.

(10) Patent No.: US 7,219,857 B2
(45) Date of Patent: May 22, 2007

(54) CONTROLLABLE REFUELING DROGUES AND ASSOCIATED SYSTEMS AND METHODS

(75) Inventors: John F. Takacs, Seattle, WA (US); Stephen M. Stecko, Seattle, WA (US); Gordon R. Jefferson, Seattle, WA (US); Gregory A. Roberts, Seattle, WA (US); Joseph D. Shoore, Seattle, WA (US)

(73) Assignee: The Boeing Company, Chicago, IL (US)

( * ) Notice: Subject to any disclaimer, the term of this patent is extended or adjusted under 35 U.S.C. 154(b) by 53 days.

(21) Appl. No.: 11/157,245

(22) Filed: Jun. 20, 2005

(65) Prior Publication Data

US 2006/0284019 A1    Dec. 21, 2006

(51) Int. Cl.
B64D 39/00    (2006.01)
(52) U.S. Cl. .................................. 244/135 A
(58) Field of Classification Search ............. 244/135 A
See application file for complete search history.

(56) References Cited

U.S. PATENT DOCUMENTS

| | | | |
|---|---|---|---|
| 724,675 | A | 4/1903 | Decker |
| 2,091,916 | A | 8/1937 | Evans |
| 2,213,680 | A | 9/1940 | Barnett |
| 2,414,509 | A | 1/1947 | Andre |
| 2,453,553 | A | 11/1948 | Tansley |
| 2,475,635 | A | 7/1949 | Parsons |
| 2,552,991 | A | 5/1951 | McWhorter |
| 2,668,066 | A | 2/1954 | Stadelhofer |
| 2,670,913 | A | 3/1954 | Castor et al. |
| 2,859,002 | A | 11/1958 | Leisy |
| 2,919,937 | A | 1/1960 | Dovey |
| 2,953,332 | A | 9/1960 | Cobham et al. |
| 2,960,295 | A | 11/1960 | Schulz |
| 2,973,171 | A | 2/1961 | Ward et al. |
| 3,747,873 | A | 7/1973 | Layer et al. |

(Continued)

FOREIGN PATENT DOCUMENTS

DE    2744674    4/1979

(Continued)

OTHER PUBLICATIONS http://en.wikipedia.org/wiki/Electroactive_polymers last update Feb. 27, 2005.*
U.S. Appl. No. 10/857,228, Schroeder.
U.S. Appl. No. 10/890,664, Schroeder.
U.S. Appl. No. 10/896,584, Schroeder.
U.S. Appl. No. 11/078,210, Smith.
Flug Revue, "Airbus (Air Tanker) A330-200 Tanker," Jan. 26, 2004; www.flug-revue.rotor.com/FRTypen/FRA3302T.htm; MotorPresse Stuttgart, Bonn, German, (5 pgs).
Thales Avionics Ltd., "Air Tanker Bids for Future Strategic Tanker Aircraft," Jul. 3, 2001; www.thalesavionics.net/press/pr43.html; (3 pgs).
Keller, George R., "Hydraulic System Analysis", pp. 40-41, 1985, Hydraulics & Pneumatics, Cleveland, Ohio.
European Search Report for EP 06 25 3148; Applicant: The Boeing Company; dated: Oct. 27, 2006; 9 pgs.

*Primary Examiner*—Teri Pham Luu
*Assistant Examiner*—Edward J. Mayle
(74) *Attorney, Agent, or Firm*—Perkins Coie LLP

(57) ABSTRACT

Controllable refueling drogues and associated systems and methods are disclosed. A system in accordance with one embodiment includes a fuel delivery device having a deployable portion configured to be deployed overboard an aircraft during aerial refueling. The deployable portion can include at least a portion of a flexible fuel line, a drogue coupled to the flexible fuel line, and an actuatable device operatively coupled to at least one of the drogue and the fuel line. The deployable portion can further include a guidance system that is operatively coupled to the actuatable device and that includes instructions to direct the operation of the actuatable device and move the drogue during flight.

33 Claims, 4 Drawing Sheets

U.S. PATENT DOCUMENTS

| | | |
|---|---|---|
| 3,836,117 A | 9/1974 | Panicall |
| 3,928,903 A | 12/1975 | Richardson et al. |
| 4,044,834 A | 8/1977 | Perkins |
| 4,072,283 A | 2/1978 | Weiland |
| 4,095,761 A | 6/1978 | Anderson et al. |
| 4,119,294 A | 10/1978 | Schnorrenberg |
| 4,129,270 A | 12/1978 | Robinson et al. |
| 4,149,739 A | 4/1979 | Morris |
| 4,150,803 A | 4/1979 | Fernandez |
| 4,231,536 A | 11/1980 | Ishimitsu et al. |
| 4,327,784 A | 5/1982 | Denniston |
| 4,408,943 A | 10/1983 | McTamaney et al. |
| 4,438,793 A | 3/1984 | Brown |
| 4,471,809 A | 9/1984 | Thomsen et al. |
| 4,477,040 A * | 10/1984 | Karanik ............... 244/58 |
| 4,534,384 A | 8/1985 | Graham et al. |
| 4,540,144 A | 9/1985 | Perrella |
| 4,586,683 A | 5/1986 | Kerker |
| 4,665,936 A | 5/1987 | Furrer |
| 4,717,099 A | 1/1988 | Hubbard |
| 4,796,838 A | 1/1989 | Yamamoto |
| 4,883,102 A | 11/1989 | Gabrielyan et al. |
| 4,929,000 A | 5/1990 | Annestedt, Sr. |
| 5,131,438 A * | 7/1992 | Loucks ............... 141/1 |
| 5,141,178 A | 8/1992 | Alden et al. |
| 5,255,877 A | 10/1993 | Lindgren et al. |
| 5,393,015 A | 2/1995 | Piasecki |
| 5,427,333 A | 6/1995 | Kirkland |
| 5,449,203 A | 9/1995 | Sharp |
| 5,449,204 A | 9/1995 | Greene et al. |
| 5,530,650 A | 6/1996 | Biferno et al. |
| 5,539,624 A | 7/1996 | Dougherty |
| 5,573,206 A | 11/1996 | Ward |
| 5,785,276 A | 7/1998 | Ruzicka |
| 5,810,292 A | 9/1998 | Garcia, Jr. et al. |
| 5,904,729 A | 5/1999 | Ruzicka |
| 5,906,336 A | 5/1999 | Eckstein |
| 5,921,294 A | 7/1999 | Greenhalgh et al. |
| 5,996,939 A | 12/1999 | Higgs et al. |
| 6,076,555 A | 6/2000 | Hettinger |
| 6,119,981 A | 9/2000 | Young et al. |
| 6,145,788 A | 11/2000 | Mouskis et al. |
| 6,302,448 B1 | 10/2001 | Van Der Meer et al. |
| 6,305,336 B1 | 10/2001 | Hara et al. |
| 6,324,295 B1 * | 11/2001 | Valery et al. ............... 382/100 |
| 6,326,873 B1 | 12/2001 | Faria |
| 6,375,123 B1 | 4/2002 | Greenhalgh et al. |
| 6,428,054 B1 | 8/2002 | Zappa et al. |
| 6,454,212 B1 | 9/2002 | Bartov |
| 6,464,173 B1 | 10/2002 | Bandak |
| 6,467,725 B1 * | 10/2002 | Coles et al. ............... 244/58 |
| 6,588,465 B1 | 7/2003 | Kirkland et al. |
| 6,598,830 B1 | 7/2003 | Ambrose et al. |
| 6,601,800 B2 | 8/2003 | Ollar |
| 6,604,711 B1 * | 8/2003 | Stevens et al. ......... 244/135 A |
| 6,651,933 B1 | 11/2003 | von Thal et al. |
| 6,669,145 B1 * | 12/2003 | Green ............... 244/135 A |
| 6,676,379 B2 * | 1/2004 | Eccles et al. ........... 416/170 R |
| 6,752,357 B2 | 6/2004 | Thal et al. |
| 6,779,758 B2 | 8/2004 | Vu et al. |
| 6,796,527 B1 * | 9/2004 | Munoz et al. ........... 244/118.5 |
| 6,819,982 B2 | 11/2004 | Doane |
| 6,824,105 B2 * | 11/2004 | Edwards ............... 244/135 A |
| 6,832,743 B2 | 12/2004 | Schneider et al. |
| 6,837,462 B2 | 1/2005 | von Thal et al. |
| 6,848,720 B2 | 2/2005 | Carns et al. |
| 2003/0038214 A1 | 2/2003 | Bartov |
| 2003/0097658 A1 | 5/2003 | Richards |
| 2003/0136874 A1 | 7/2003 | Gjerdrum |
| 2004/0129865 A1 | 7/2004 | Doane |
| 2005/0055143 A1 | 3/2005 | Doane |
| 2006/0071475 A1 | 4/2006 | James et al. |
| 2006/0278759 A1 | 12/2006 | Carns et al. |
| 2006/0284018 A1 | 12/2006 | Carns et al. |

FOREIGN PATENT DOCUMENTS

| | | |
|---|---|---|
| DE | 29901583 | 5/1999 |
| DE | 10013751 | 10/2001 |
| EP | 0807577 | 11/1997 |
| EP | 1094001 | 4/2001 |
| EP | 1361156 | 11/2003 |
| EP | 1695911 | 8/2006 |
| GB | 555984 | 9/1943 |
| GB | 2257458 | 1/1993 |
| GB | 2373488 | 9/2002 |
| GB | 2 405 384 | 3/2005 |
| IT | 128459 | 5/2003 |
| RU | 673798 | 7/1979 |
| RU | 953345 | 8/1982 |
| RU | 2111154 | 5/1998 |
| RU | 2140381 | 10/1999 |
| RU | 2142897 | 12/1999 |
| TW | 386966 | 4/2000 |
| WO | WO-85/02003 | 5/1985 |
| WO | WO-91/06471 | 5/1991 |
| WO | WO-97/33792 | 9/1997 |
| WO | WO-98/07623 | 2/1998 |
| WO | WO-98/39208 | 9/1998 |
| WO | WO-98/54053 | 12/1998 |
| WO | WO-02/24529 | 3/2002 |
| WO | WO-02/055385 | 7/2002 |
| WO | WO-02/76826 | 10/2002 |
| WO | WO-03/102509 | 12/2003 |

\* cited by examiner

CONTROLLABLE REFUELING DROGUES AND ASSOCIATED SYSTEMS AND METHODS

TECHNICAL FIELD

The present invention is directed generally toward controllable refueling drogues and associated systems and methods, including refueling drogues having on-board guidance systems and actuators.

BACKGROUND

In-flight refueling (or air-to-air refueling) is an important method for extending the range of aircraft traveling long distances over areas having no feasible landing or refueling points. Although in-flight refueling is a relatively common operation, especially for military aircraft, the aircraft to be refueled (e.g., the receiver aircraft) must be precisely positioned relative to the tanker aircraft in order to provide safe engagement while the fuel is dispensed to the receiver aircraft. The requirement for precise relative spatial positioning of the two rapidly moving aircraft makes in-flight refueling a challenging operation.

There are currently two primary systems for in-flight refueling. One is a hose and drogue system, which includes a refueling hose having a drogue disposed at one end. The hose and drogue are trailed behind the tanker aircraft once the tanker aircraft is on station. The pilot of the receiver aircraft then flies the receiver aircraft to intercept and couple with the drogue for refueling. Another existing system is a boom refueling system. The boom refueling system typically includes a rigid boom extending from the tanker aircraft, with a probe and nozzle at its distal end. The boom also includes airfoils controlled by a boom operator stationed on the refueling aircraft. The airfoils allow the boom operator to actively maneuver the boom with respect to the receiver aircraft, which flies in a fixed refueling position below and aft of the tanker aircraft.

One approach to addressing the challenge associated with precisely positioning the tanker aircraft relative to the receiver aircraft is to automate the positioning process. For example, one existing arrangement for boom refueling systems includes cameras housed in the tanker aircraft to determine the distance between the receiver aircraft and the tip of a refueling boom carried by the tanker aircraft. The system can then be used to automatically control the position of the boom to mate with a corresponding refueling receptacle of the receiver aircraft. The system can be configured to allow the boom operator to take control of the movement of the boom, for example, if the automatic system malfunctions or if for any reason the refueling boom must be directed away from the receiver aircraft. However, the applicability of this system has been limited to certain boom-outfitted tanker aircraft and can in some cases significantly impact the cost of such aircraft.

SUMMARY

The following summary is provided for the benefit of the reader only, and does not limit the invention as set forth by the claims. Aspects of the invention are directed generally to controllable refueling drogues and associated systems and methods. An airborne refueling system in accordance with one aspect of the invention includes a fuel delivery device having a deployable portion configured to be deployed overboard an aircraft during aerial refueling. The deployable portion can include at least a portion of a flexible fuel line and a drogue coupled to the flexible fuel line. An actuatable device can be operatively coupled to at least one of the drogue and the fuel line. The system can further include a guidance system carried by the deployable portion and operatively coupled to the actuatable device. The guidance system can include instructions to direct the operation of the actuatable device and move the drogue during flight.

In further particular aspects, the system can further include a refueling aircraft, with the fuel delivery device being carried by the refueling aircraft. The guidance system can, in at least some embodiments direct the operation of the actuatable device without instructions from the refueling aircraft when deployed. In still further embodiments, the system can include at least one sensor configured to detect a characteristic of a location of a receiver aircraft probe. The guidance system can be programmed to use the information received from the at least one sensor to direct the operation of the actuatable device to position the drogue for coupling with the receiver aircraft probe.

An airborne refueling system in accordance with another aspect of the invention can include a fuel delivery device that in turn includes a flexible fuel line and a drogue coupled to the flexible fuel line. The drogue can include multiple vanes arranged around an axis, and can further include a canopy coupled to the vanes. At least one actuator can be coupled to the canopy, or at least one of the vanes, or both the canopy and at least one of the vanes. In further specific embodiments, the actuator can include an electro-active polymer actuator.

A method for refueling an aircraft in accordance with another aspect of the invention can include aerially deploying from a tanker aircraft a portion of a refueling system that includes a flexible fuel line and a drogue. The method can further include automatically changing a position of the drogue by controlling an actuator operatively coupled to the drogue, based at least in part on information received from a guidance system carried by the deployed portion of the refueling system.

In further particular embodiments, the method can include guiding the drogue into a coupling position with a receiver aircraft, without guidance instructions from the tanker aircraft. The drogue can include multiple vanes arranged around an axis, and a canopy coupled to the vanes. Changing a position of the drogue can include steering the drogue by changing a position of the canopy, at least one of the vanes, or both the canopy and at least one of the vanes.

DETAILED DESCRIPTION

The present disclosure describes controllable refueling drogues and associated systems and methods for refueling aircraft with drogues. Certain specific details are set forth in the following description and in FIGS. 1–5 to provide a thorough understanding of various embodiments of the invention. Well-known structures, systems and methods often associated with such systems have not been shown or described in detail to avoid unnecessarily obscuring the description of the various embodiments of the invention. In addition, those of ordinary skill in the relevant art will understand that additional embodiments of the invention may be practiced without several of the details described below.

Many embodiments of the invention described below may take the form of computer-executable instructions, including routines executed by a programmable computer. Those skilled in the relevant art will appreciate that the invention can be practiced on computer systems other than those shown and described below. The invention can be embodied in a special-purpose computer or data processor that is specifically programmed, configured or constructed to perform one or more of the computer-executable instructions described below. Accordingly, the term "computer" as generally used herein refers to any data processor and can include multi-processor systems and/or networks. For example, the information can be processed in distributed environments, where tasks or modules are performed by remote processing devices that are linked through a communications network. In a distributed computing environment, program modules or subroutines may be located in local and remote memory storage devices. Aspects of the invention described below may be stored or distributed on computer-readable media, including magnetically readable or removable computer disks, as well as distributed over networks. Data structures and transmissions of data particular to aspects of the invention are also encompassed within the scope of the invention.

Figure 1:
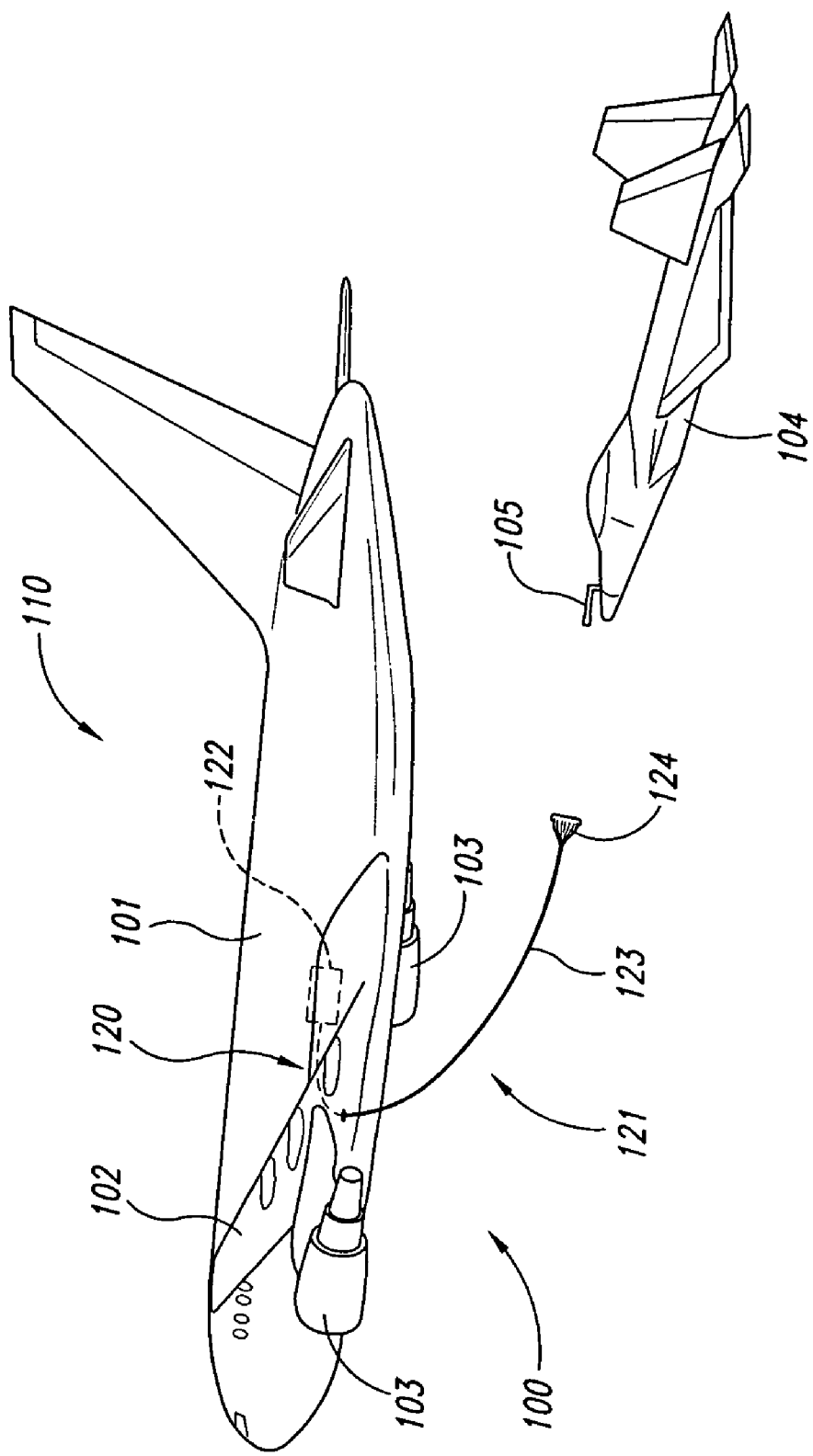
FIG. 1 is a partially schematic, isometric illustration of a tanker aircraft refueling a receiver aircraft in accordance with an embodiment of the invention.

FIG. 1 illustrates a system 110 that includes a tanker aircraft 100 positioned to couple with and refuel a receiver aircraft 104, using an aerial refueling device 120 configured in accordance with an embodiment of the invention. The tanker aircraft 100 has a fuselage 101, wings 102, and one or more engines 103 (two are shown in FIG. 1 as being carried by the wings 102). In other embodiments, the aircraft 100 can have other configurations. In a particular aspect of the embodiment shown in FIG. 1, the aerial refueling device 120 can include an on-board portion 122 (e.g., a hose reel activator and associated valving) and a deployable portion 121. The deployable portion 121 can include a hose 123 and a drogue 124. The position of the drogue 124 can be controlled in an automatic fashion to couple with a probe 105 of the receiver aircraft 104. In at least some embodiments, the guidance system for effectuating this control can be carried entirely by the deployable portion 121 of the refueling device 120. Accordingly, not only can the process for coupling the drogue 124 to the receiver aircraft 104 be automated or at least partially automated, but the components that execute the automated process need not be carried on-board the tanker aircraft 100. This arrangement can simplify the tanker aircraft 100 and can significantly reduce the effort and expense required to retrofit the guidance system on an existing drogue-carrying tanker aircraft 100.

Figure 2:
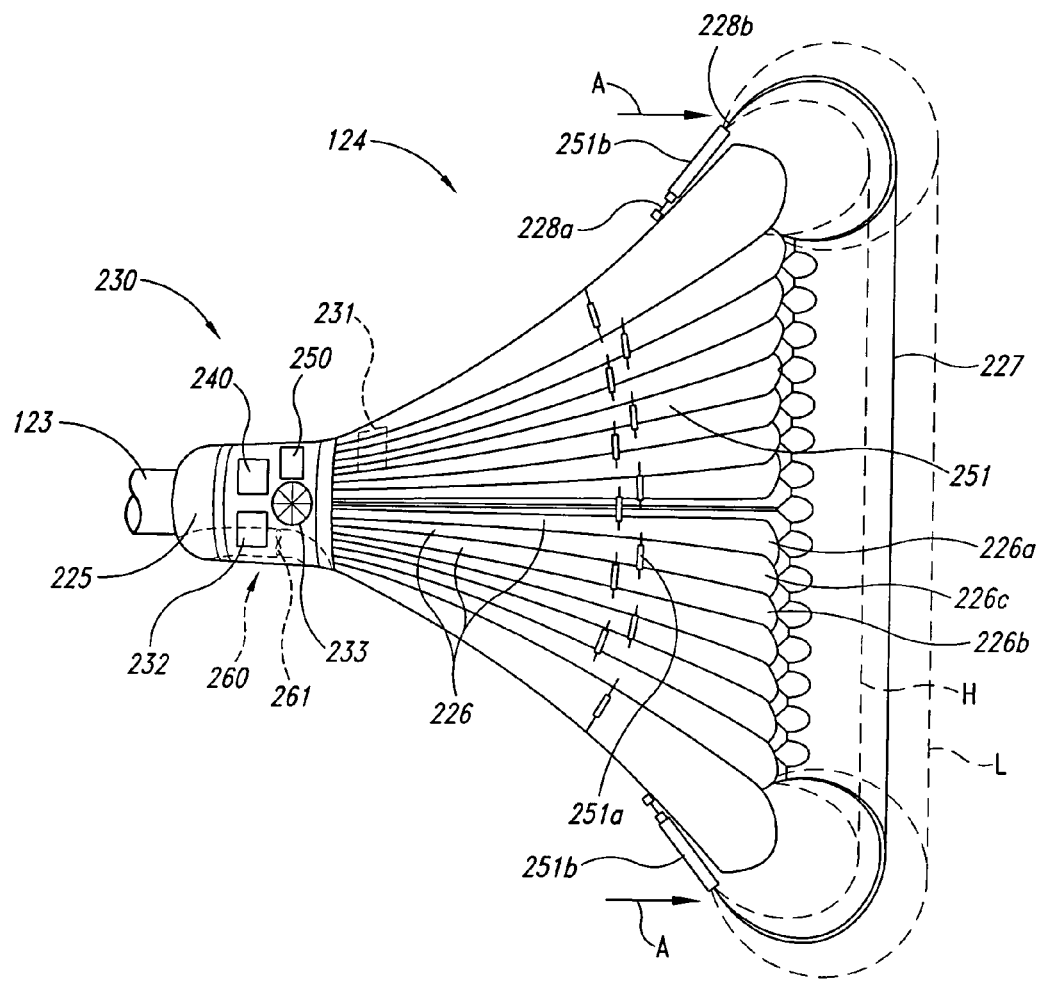
FIG. 2 is a partially schematic illustration of a drogue that includes actuators and a guidance system configured in accordance with an embodiment of the invention.

FIG. 2 is an enlarged, side isometric illustration of an embodiment of the drogue 124 described above with reference to FIG. 1. The drogue 124 can include a coupling 225 that attaches the drogue 124 to the fuel hose 123. The drogue 124 can also include movable, overlapping vanes 226, and a canopy 227. When the vanes 226 are spread out from each other, the maximum diameter of the drogue 124 increases, and when the vanes 226 are drawn together, the maximum diameter of the drogue 124 decreases. The canopy 227 can operate like a donut-shaped parachute and can be filled by incoming air indicated by arrows A. If the canopy 227 is drawn tightly down over the vanes 226, the drogue 124 can have a generally streamlined shape suitable for high speed flight. If the canopy 227 is allowed to more fully inflate, the drogue 124 can be operated at lower flight speeds.

The drogue 124 can include actuators 251 to control the motion of the vanes 226 and/or the canopy 227. For example, the actuators 251 can include vane actuators 251$a$ and/or canopy actuators 251$b$. The vane actuators 251$a$ can be attached between alternate vanes 226, and can be configured to extend or retract. Accordingly, when a particular vane actuator 251$a$ retracts, it can pull two vanes 226$a$, 226$b$ together relative to an intermediate vane 226$c$. When the vane actuators 251$a$ are extended, they can move the same two vanes 226$a$, 226$b$ apart relative to the intermediate vane 226$c$.

The canopy actuators 251$b$ can be attached to an inner and/or outer line of the canopy 227. For example, as shown in FIG. 2, the canopy 227 can be attached with a fixed line 228$a$ to the outwardly facing surfaces of the vanes 226, and can be attached with variable length lines 228$b$ to the inwardly facing surfaces of the vanes 226. The canopy actuators 251$b$ can also be attached to the variable length lines 228$b$ and can move between an extended position and a retracted position. In the retracted position, the canopy actuators 251$b$ can draw the canopy 227 more tightly around the vanes 226 (e.g., for a streamlined, high speed configuration), and when extended, the canopy actuators 251$b$ can allow the canopy to expand and inflate for a low speed configuration. A representative high speed configuration is identified by dashed lines H, and a representative low speed configuration is identified by dashed lines L.

The motion of the actuators 251 can be controlled by a guidance system 240 and a control system 250 carried by the deployable portion 121 of the fuel delivery device 120. The guidance system 240 can receive information corresponding to the current state of the drogue 124 and, in at least some embodiments, a target state of the drogue 124. The guidance system 240 can provide instructions to the control system 250 that in turn directs the actuators 251 to drive the configuration of the drogue 124 from the current state to the target state. In particular embodiments, the guidance system 240 can be coupled to a sensor system 230 that includes one or more accelerometers 232, one or more gyros 233, and an image sensor 231. The accelerometer 232 and/or gyros 233 can provide information corresponding to the current motion of the drogue 124, and the image sensor 231 can provide information corresponding to the location of the drogue 231. For example, the image sensor 231 can provide information corresponding to the location of the drogue 124 relative to a receiver aircraft that is approaching the drogue 231 for coupling. Further details of the interactions among the sensor system 230, the guidance system 240, the control system 250 and the actuators 251 are provided with reference to FIGS. 3–5.

In a particular aspect of an embodiment shown in FIG. 2, the deployable portion 121 of the fuel delivery device 120 can include a self-contained power system 260. For example, the deployable portion 121 can include a wind turbine generator 261 (shown schematically in FIG. 2) that provides power to the guidance system 240, the sensor system 230, the control system 250 and/or the actuators 251. In other embodiments, the power system 260 can include other devices.

Figure 3:
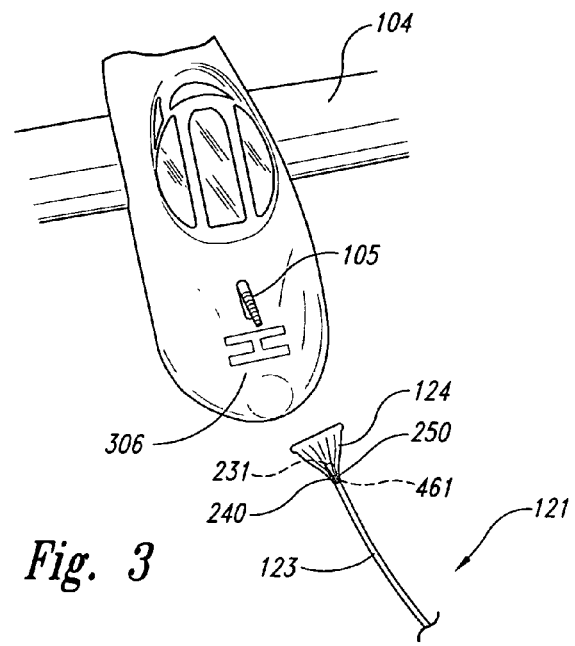
FIG. 3 is a partially schematic, top isometric view of a representative receiver aircraft and drogue positioned for coupling in accordance with an embodiment of the invention.

FIG. 3 illustrates the receiver aircraft 104 approaching the drogue 124 for coupling. The image sensor 231 carried by the drogue 124 can include a camera or other optical device that images the receiver aircraft 104. The image information received by the image sensor 231 can be used to provide one or more of the following functions. One function includes identifying the type of receiver aircraft 104 to which the drogue 124 will be coupled. In one aspect of this embodiment, the inherent features of the receiver aircraft 104 may be sufficient to allow such a determination. In another embodiment, the receiver aircraft 104 can include one or more visual cue markings 306 that can be easily picked up and discriminated by the image sensor 231. The guidance system 240 can then be configured to compare the characteristics of the receiver aircraft 104 picked up by the image sensor 231 and compare them to a stored listing of known receiver aircraft characteristics. Using this technique, the guidance system 240 can identify the type of receiver aircraft 104 approaching the drogue 124.

In some embodiments, the aircraft identification function described above can be eliminated. For example, the resolution capability of the image sensor 231 may be such that it need only image the end of the probe 105 (independent of what type of receiver aircraft the probe is attached to) to provide appropriate guidance information. This can be the case for different aircraft having the same or different probes 105.

Another function that can be provided by the image sensor 231 includes providing information suitable for the guidance system 240 and control system 250 to steer the drogue 124 toward the probe 105 of the receiver aircraft 104. For example, if the data from image sensor 231 indicates that the probe 105 (or the visual cue markings 306) are off-center, then the guidance system 240 and control system 250 can steer the drogue 124 until it is centered on the probe 105. As described above, the sensor 231 can have a resolution capability sufficient to enable the steering function when used with probes 105 that may have different configurations.

Figures 4A, 4B:
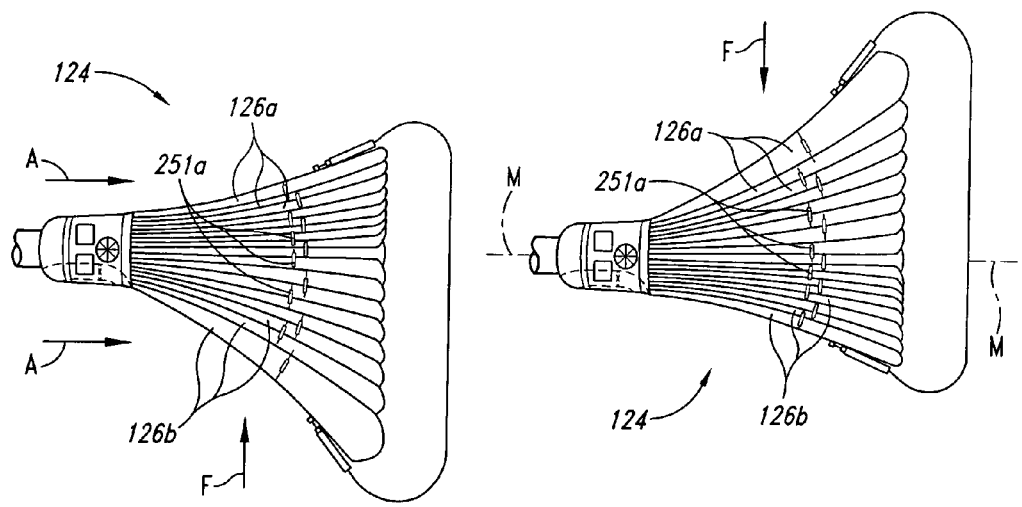
FIGS. 4A–4B are schematic illustrations of the drogue shown in FIG. 2 with the vanes positioned to place a steering force on the drogue in accordance with embodiments of the invention.

FIGS. 4A and 4B are schematic side isometric views of the drogue 124, and illustrate a representative manner by which the shape of the drogue 124 can be changed to move the drogue 124 in a particular direction. In one aspect of this embodiment, the drogue 124 can include upper vanes 126a and lower vanes 126b. As shown in FIG. 4A, the vane actuators 251a can be actuated so as to draw the upper vanes 126a more closely together than the lower vanes 126b. As a result, the lower vanes 126b provide more frontal area to the free stream flow of air identified by arrows A. This in turn creates an upwardly directed force F which moves and/or pivots the drogue 124 in an upward direction. As shown in FIG. 4B, the relative spacings for the upper vanes 126a and the lower vanes 126b can be reversed to create a downward force F. A similar arrangement can be used to change the shape of the drogue 124 in a lateral direction (e.g., into and out of the plane of FIGS. 3A, 3B) and/or any intermediate direction. In any of these positions, the drogue 124 can have an asymmetric shape relative to its major axis M. The asymmetric shape can be used to steer the drogue 124 in the pitch and yaw directions.

Figure 5:
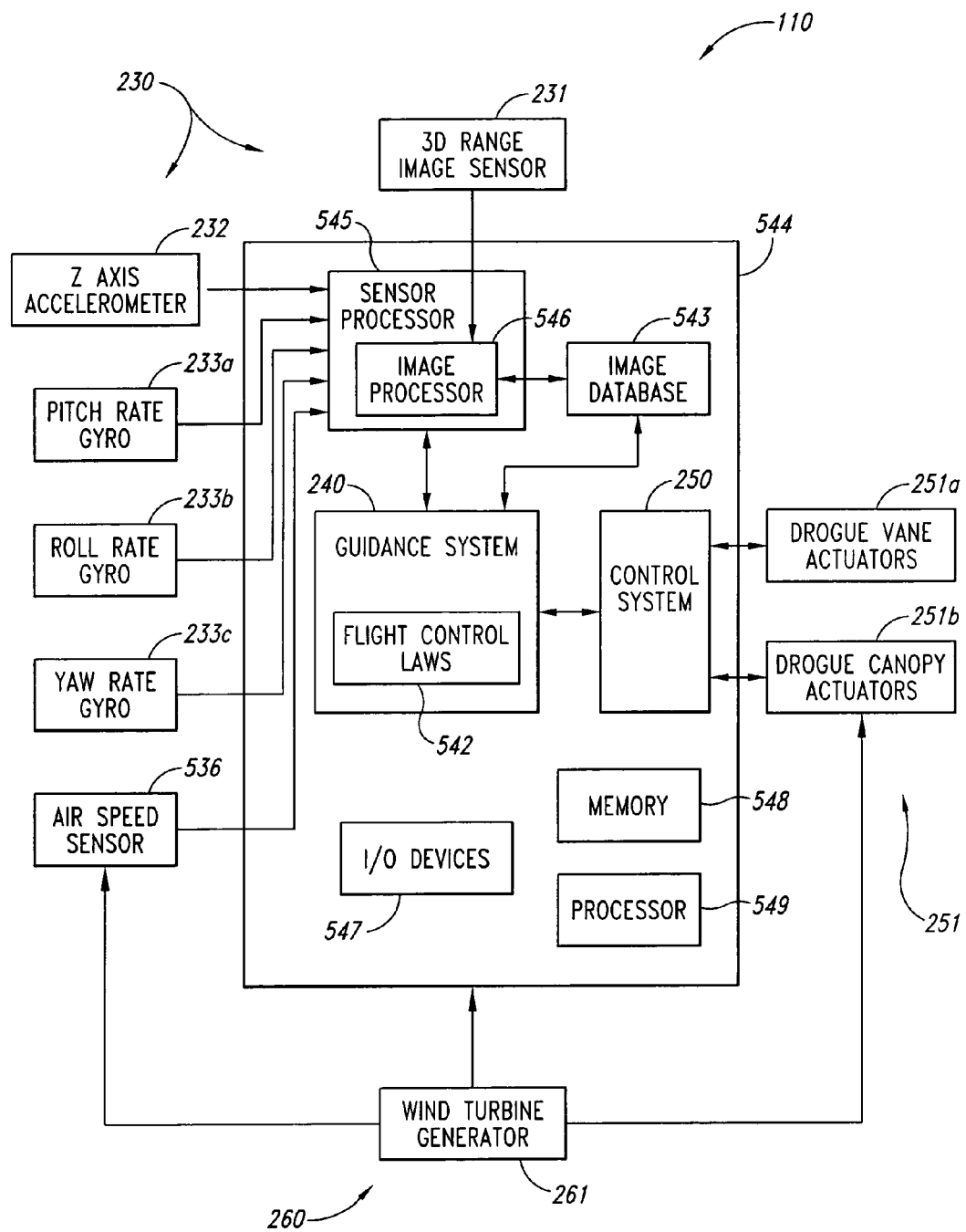
FIG. 5 is a block diagram illustrating components of a system for guiding a refueling drogue in accordance with an embodiment of the invention.

FIG. 5 is a block diagram illustrating representative components of the overall system 110 described above. Many components of the system 110 (e.g., the guidance system 240 and the control system 250) can be computer-based. Accordingly, the system 110 can include a computer 544 having a processor 549, memory 548 and I/O devices 547. Functions provided by the computer 544 can be carried out by and/or supported by any of these or other components. Such functions include sensor processing carried out by a sensor processor 545. The sensor processor 545 can receive information from the sensor system 230, which can in turn include the accelerometer 232 (e.g., a Z-axis accelerometer), and one or more gyros 230 (e.g., a pitch rate gyro 233a, a roll rate gyro 233b, and a yaw rate gyro 233c). The sensor system 230 can further include an air speed sensor 536 and the image sensor 231 (e.g., a 3-D range image sensor). Accordingly, the guidance system 240 can compare the image data received from the image sensor 231 with data stored on an image database 543. This information can be used to identify the receiver aircraft, and/or determine the difference between the current location of the drogue and a target location for the drogue. Flight control laws 542 can be used to transform the difference between the current and target locations of the drogue into directives for the control system 250. Based on these directives, the control system 250 can issue commands to the actuators 251. When the actuators 251 receive the commands, they drive the drogue toward the target position, with feedback provided by the image sensor 231. The actuators 251 can also provide feedback to the control system 250 and the guidance system 240. For example, the actuators 251 can provide feedback information corresponding to the loads on the drogue. The information can in turn be used by the guidance system 240 to trim the loads on the drogue 124 (FIG. 2) to provide for smooth, stable flight of the drogue.

One feature of an embodiment of the systems described above with reference to FIGS. 1–5 is that they can include the capability for automatically controlling the position of a refueling drogue beyond the positioning capability provided by simply changing the direction or speed of the tanker aircraft from which the drogue is deployed. An advantage of this capability is that it can reduce the workload required by the pilot of the receiver aircraft to successfully couple his or her aircraft with the drogue.

In a further aspect of this embodiment, the motion of the drogue can be fully automated. This can even further reduce the workload required by the pilot of the receiver aircraft. For example, in some cases, this arrangement can allow the receiver aircraft pilot to remain on station (in much the same manner as is currently used when refueling an aircraft via a refueling boom) while the guidance system automatically steers the drogue to a coupling position with the receiver aircraft, and trims the drogue so that it remains in a stable position. An advantage of this arrangement is that it can increase the likelihood for a successful coupling with the receiver aircraft, and can reduce the likelihood for damage to the receiver aircraft or the refueling system. For example, in some refueling operations, the bow wave of the receiver aircraft can push the drogue away from the receiver aircraft every time the receiver aircraft gets close to the drogue. An embodiment of the foregoing automated system can automatically steer the drogue through the bow wave for a successful coupling.

Another feature of an embodiment of the systems described above with reference to FIGS. 1–5 is that the guidance system can be entirely or nearly entirely independent of the receiver aircraft. For example, the guidance system can be housed entirely on the deployable portion of the fuel delivery device, and need not receive guidance-related instructions or power from the receiver aircraft. Instead, the guidance system can receive power from an on-board power system, and, as a result of the closed loop arrangement with the image sensor, can provide a self-contained guidance function independent of the receiver aircraft. In some embodiments, at least some communication can exist between the tanker aircraft and the guidance system, for example, to activate, deactivate, and/or override the guidance system, and/or to provide signals to the tanker refueling system that indicate when coupling is complete and/or when hose slack should be taken up. However, once activated, the guidance system can steer the drogue autonomously. An advantage of this feature is that it can significantly reduce the hardware and software required to be installed on the tanker aircraft, either upon initial installation of the fuel delivery device, or upon retrofitting an existing fuel delivery device to include the automated guidance features described above. As a result, this arrangement can achieve significant cost savings over existing systems.

Yet another feature of at least some of the foregoing embodiments is that they can include changing the shape and/or size of the drogue. For example, the overall size of the drogue can be made larger or smaller, which can in turn make the drogue suitable for both low speed and high speed use. An advantage of this arrangement over existing arrangements is that the drogue need not be changed out when the tanker aircraft is required to refuel aircraft having different speeds when in a refueling. For example, by simply changing the shape of the drogue, the same drogue can be used to refuel helicopters, prop aircraft, and jet fighter aircraft, each of which has a different flight speed when located on station. In addition to changing the size of the drogue, the foregoing systems and methods can be used to change the shape of the drogue, e.g., in an asymmetric manner. An advantage of such shape changes is that they can enable the drogue to be steered into alignment with the receiver aircraft, and/or trimmed once in a desired position.

Many aspects of the foregoing embodiments can have particular configurations in some instances and other configurations in other instances. For example, the actuators can in some embodiments include electro-active polymer (EAP) actuators, to control the motion of the vanes and/or the canopy. Suitable actuators and designs are available from SRI International of Menlo Park, Calif. An advantage of EAP actuators is that they can apply a substantial force while remaining relatively small in size, and without requiring significant levels of power. In other embodiments, the actuators can have other configurations. The guidance system can in some embodiments include a single-board microcomputer, or another suitable, lightweight, low volume device. The sensors can include solid state sensors (e.g., MEMS or micro-electro-mechanical systems) for the gyros and/or accelerometers. The image sensor can be a combination of a laser 3-D imager, a laser ranger, an optical proximity sensor, a visible-spectrum camera, and/or an infrared camera.

From the foregoing, it will be appreciated that specific embodiments of the invention have been described herein for purposes of illustration, but that various modifications may be made without deviating from the invention. For example, the sensors and/or actuators can have arrangements different than those described above, while still providing data and controlling drogue movement in manners generally similar to those described above. In some embodiments, some components of the system may be carried by the tanker aircraft without precluding the system from achieving at least some of the foregoing advantages. For example, aspects of the sensor system (e.g., the image sensor) and/or the guidance system may be housed in the tanker aircraft, while still allowing the system to steer and/or trim the drogue via the actuated vanes and/or canopy. The refueling system can be installed on aircraft having configurations other than the tanker aircraft 100 shown in FIG. 1, and can be used to refuel aircraft having configurations other than those of the receiver aircraft 104 shown in FIG. 1. Aspects of the invention described in the context of particular embodiments may be combined or eliminated in other embodiments. Further, while advantages associated with certain embodiments of the invention have been described in the context of those embodiments, other embodiments may also exhibit such advantages, and not all embodiments need necessarily exhibit such advantages to fall within the scope of the invention. Accordingly, the invention is not limited except as by the appended claims.

We claim:

1. An airborne refueling system, comprising: a fuel delivery device having a deployable portion configured to be deployed overboard an aircraft during aerial refueling, the deployable portion including: at least a portion of a flexible fuel line;
   a drogue coupled to the flexible fuel line, the drogue having multiple vanes arranged around an axis, and movable in a circumferential direction relative to the axis;
   an actuable device operatively coupled to at least one of the vanes to move the vanes in a circumferential direction relative to the axis; and
   a guidance system carried by the deployable portion and operatively coupled to the actuable device, the guidance system including instructions to direct the operation of the actuable device and move the drogue during flight.

2. The system of claim 1, further comprising:
   a refueling aircraft, wherein the fuel delivery device is carried by the refueling aircraft;
   and wherein the guidance system directs the operation of the actuatable device without instructions from the refueling aircraft when deployed;
   further wherein the guidance system includes a database of receiver aircraft image data, and wherein the system further comprises at least one sensor configured to detect a characteristic of a receiver aircraft, and wherein the guidance system is programmed to compare the image data with information received from the at least one sensor and direct the operation of the actuatable device to position the drogue for coupling with the receiver aircraft.

3. The system of claim 1, further comprising at least one sensor configured to detect a location of a receiver aircraft probe, and wherein the guidance system is programmed to use information received from the at least one sensor to direct the operation of the actuatable device to position the drogue for coupling with the probe of the receiver aircraft.

4. The system of claim 1, further comprising a refueling aircraft, wherein the fuel delivery device is carried by the refueling aircraft, and wherein the guidance system directs the operation of the actuatable device without instructions from the refueling aircraft when deployed.

5. The system of claim 1, further comprising a controller carried by the deployed portion and coupled to the guidance system and the actuatable device, the controller being programmed with instructions to receive guidance commands from the guidance system and direct commands to the actuatable device based at least in part on the commands received from the guidance system.

6. The system of claim 1, further comprising a wind-driven power system carried by the deployed portion and coupled to the guidance system.

7. The system of claim 1, further comprising at least one sensor carried by the deployable portion, the sensor being positioned to detect the location of at least one of the deployable portion and a receiver aircraft proximate to the deployable portion.

8. The system of claim 1 wherein the drogue includes a canopy coupled to the vanes.

9. The system of claim 8 wherein the acutuatable device includes an electro-active polymer actuator.

10. An airborne refueling system, comprising:
a fuel delivery device having a deployable portion configured to be deployed overboard an aircraft during aerial refueling, the deployable portion including:
at least a portion of a flexible fuel line;
a drogue coupled to the flexible fuel line and arranged around a major axis;
actuation means for changing a shape of the drogue to be eccentric relative to the major axis; and
guidance means for directing the operation of the actuation means.

11. The system of claim 10, further comprising sensing means configured to detect a location of a receiver aircraft probe, and wherein the guidance means is configured to direct the operation of the actuation means to position the drogue for coupling with the probe.

12. The system of claim 10, further comprising a refueling aircraft, wherein the fuel delivery device is carried by the refueling aircraft, and wherein the guidance means directs the operation of the actuation means without instructions from the refueling aircraft when deployed.

13. The system of claim 10, further comprising control means carried by the deployed portion and coupled to the guidance means and the actuation means, the control means being programmed with instructions to receive guidance commands from the guidance means and direct commands to the actuation means based at least in part on the commands received from the guidance means.

14. The system of claim 10, further comprising sensor means for sensing the location of at least one of the deployable portion and a receiver aircraft proximate to the deployable portion, the sensing means being carried by the deployable portion.

15. An airborne refueling system, comprising:
a fuel delivery device that includes:
a flexible fuel line;
a drogue coupled to the flexible fuel line, the drogue including multiple vanes arranged around an axis, the drogue further including a canopy coupled to the vanes; and
at least one actuator coupled to at least one of the vanes to move the vane in a circumferential direction relative to the axis.

16. The system of claim 15 wherein the at least one actuator includes an electro-active polymer actuator.

17. The system of claim 15 wherein the at least one actuator is positioned to move at least one of the vanes relative to another of the vanes.

18. The system of claim 15 wherein the at least one actuator is positioned to control a size, shape or size and shape of the canopy.

19. The system of claim 15, further comprising a guidance system operatively coupled to the at least one actuator, the guidance system being programmed with instructions to control a motion of the drogue by selectively directing the at least one actuator to actuate.

20. A method for refueling an aircraft, comprising:
aerially deploying from a tanker aircraft a portion of a refueling system that includes a flexible fuel line and a drogue arranged around a major axis; and
changing a position of the drogue by controlling an actuator operatively coupled to the drogue and carried by the deployed portion of the refueling system, wherein activation of the actuator causes the drogue to assume an eccentric shape relative to the major axis.

21. The method of claim 20 wherein changing a position of the drogue includes automatically changing the position of the drogue based at least in part on information received from a guidance system carried by the deployed portion of the refueling system.

22. The method of claim 20, further comprising guiding the drogue into a coupling position with a receiver aircraft without guidance instructions from the tanker aircraft.

23. The method of claim 20 wherein the drogue includes multiple vanes arranged around an axis, and a canopy coupled to the vanes, and wherein changing a position of the drogue includes steering the drogue by changing a position of the canopy, at least one of the vanes, or both the canopy and at least one of the vanes.

24. The method of claim 20, further comprising detecting a difference between an actual position of a receiver aircraft and a target position of a receiver aircraft and directing the drogue to move in a manner that reduces the difference.

25. The method of claim 20, further comprising:
detecting a characteristic of a receiver aircraft;
comparing the detected characteristic with information corresponding to known receiver aircraft; and
identifying the receiver aircraft.

26. The system of claim 1 wherein adjacent vanes overlap each other and wherein actuation of the actuatable device changes an amount by which adjacent vanes overlap each other.

27. The system of claim 1 wherein the actuatable device is connected between adjacent overlapping vanes.

28. The system of claim 10 wherein the drogue includes multiple vanes that are movable relative to each other in a circumferential direction to assume the eccentric shape.

29. The system of claim 15 wherein adjacent vanes overlap each other and wherein actuation of the actuatable device changes an amount by which adjacent vanes overlap each other.

30. The method of claim 20 wherein changing a position of the drogue includes changing an amount by which adjacent vanes of the drogue overlap each other in a circumferential direction.

31. An airborne refueling system, comprising:
a fuel delivery device that includes:
a flexible fuel line;
a drogue coupled to the flexible fuel line, the drogue including multiple vanes arranged around an axis; and
at least one actuator coupled to at least one of the vanes to move the at least one vane in a circumferential direction relative to the axis.

32. The system of claim 31 wherein adjacent vanes overlap each other and wherein actuation of the actuatable device changes an amount by which adjacent vanes overlap each other.

33. The system of claim 31 wherein the actuatable device is connected between adjacent overlapping vanes.

* * * * *

UNITED STATES PATENT AND TRADEMARK OFFICE
CERTIFICATE OF CORRECTION

PATENT NO. : 7,219,857 B2  
APPLICATION NO. : 11/157245  
DATED : May 22, 2007  
INVENTOR(S) : Takacs et al.

It is certified that error appears in the above-identified patent and that said Letters Patent is hereby corrected as shown below:

On title page Item [56]
Other Publications
Line 3, "10/857,228" should be -- 10/857,226 --

Column 8 claim 1
Line 34, "actuable" should be --acutuatable--;
Line 40, "actuable" should be --acutuatable--;

Signed and Sealed this

Twenty-fourth Day of July, 2007

JON W. DUDAS  
*Director of the United States Patent and Trademark Office*